US007900801B2

(12) United States Patent
Huang (10) Patent No.: US 7,900,801 B2
(45) Date of Patent: Mar. 8, 2011

(54) MULTI-FUNCTION VEHICLE-CARRYING FRAME

(76) Inventor: Chin-Sung Huang, Changhuwa Hsien (TW)

( * ) Notice: Subject to any disclaimer, the term of this patent is extended or adjusted under 35 U.S.C. 154(b) by 1148 days.

(21) Appl. No.: 11/559,961

(22) Filed: Nov. 15, 2006

(65) Prior Publication Data

US 2008/0110841 A1      May 15, 2008

(51) Int. Cl.
*B60R 9/00* (2006.01)
(52) U.S. Cl. ............ 224/500; 224/488; 224/497; 211/17
(58) Field of Classification Search .................. 224/488, 224/495, 497, 500, 502, 504, 505, 508, 309, 224/314, 321, 324, 329–331, 545, 547–551, 224/556; 211/17; 403/109.1–109.3
See application file for complete search history.

(56) References Cited

U.S. PATENT DOCUMENTS

| | | | | |
|---|---|---|---|---|
| 3,765,581 A | * | 10/1973 | Kosecoff | 224/500 |
| 3,800,967 A | * | 4/1974 | Kosecoff | 414/462 |
| 3,841,544 A | * | 10/1974 | Berger | 224/500 |
| 3,937,376 A | * | 2/1976 | Ewing | 224/508 |
| RE29,840 E | * | 11/1978 | Wasserman | 224/329 |
| 4,345,705 A | * | 8/1982 | Graber | 224/324 |
| D346,995 S | * | 5/1994 | Thulin | D12/408 |
| 6,502,729 B2 | * | 1/2003 | Ferman | 224/497 |
| 6,736,301 B1 | * | 5/2004 | Huang | 224/500 |
| 7,118,016 B1 | * | 10/2006 | Kolda | 224/500 |
| 7,165,704 B2 | * | 1/2007 | Lo | 224/499 |
| 2005/0082328 A1 | * | 4/2005 | Lo | 224/499 |

* cited by examiner

*Primary Examiner* — Nathan J Newhouse
*Assistant Examiner* — Peter Helvey
(74) *Attorney, Agent, or Firm* — Alan Kamrath; Kamrath & Associates PA (57) ABSTRACT

A multi-function vehicle-carrying frame includes a chassis, a positioning frame, a connecting rod, two first clasping poles, two second clasping poles, two third clasping poles and a support. The chassis is U-shaped. The positioning frame is reverse U-shaped and inserted into the chassis. An adjustable clipping post is disposed on a top tube of the positioning frame, and both lateral pipes are locked with a movable buffer cushion. The connecting rod is fixed between the lateral pipes of the positioning frame. The first clasping poles are pivotally connected to the lateral pipes of the positioning frame, the second clasping poles are connected to the lateral pipes of the first clasping pole or the positioning frame, and the third clasping poles are connected to the ends of the connecting rod. The support is connected to the lateral pipes of the positioning frame. Thereby, the multi-function vehicle-carrying frame is stable and practical.

19 Claims, 13 Drawing Sheets

MULTI-FUNCTION VEHICLE-CARRYING FRAME

BACKGROUND OF THE INVENTION

1. Field of the Invention

The present invention relates to a vehicle-carrying frame and, more particularly, to a multi-function vehicle-carrying frame which is stable and is applicable to different kinds of vehicles.

2. Description of the Prior Art

Nowadays, more and more people like outdoor play with bicycles. In order to meet with the needs of the market, different kinds of vehicle-carrying frames are made to enable the user to fix the bicycle on the vehicle-carrying frame.

Figure 1:
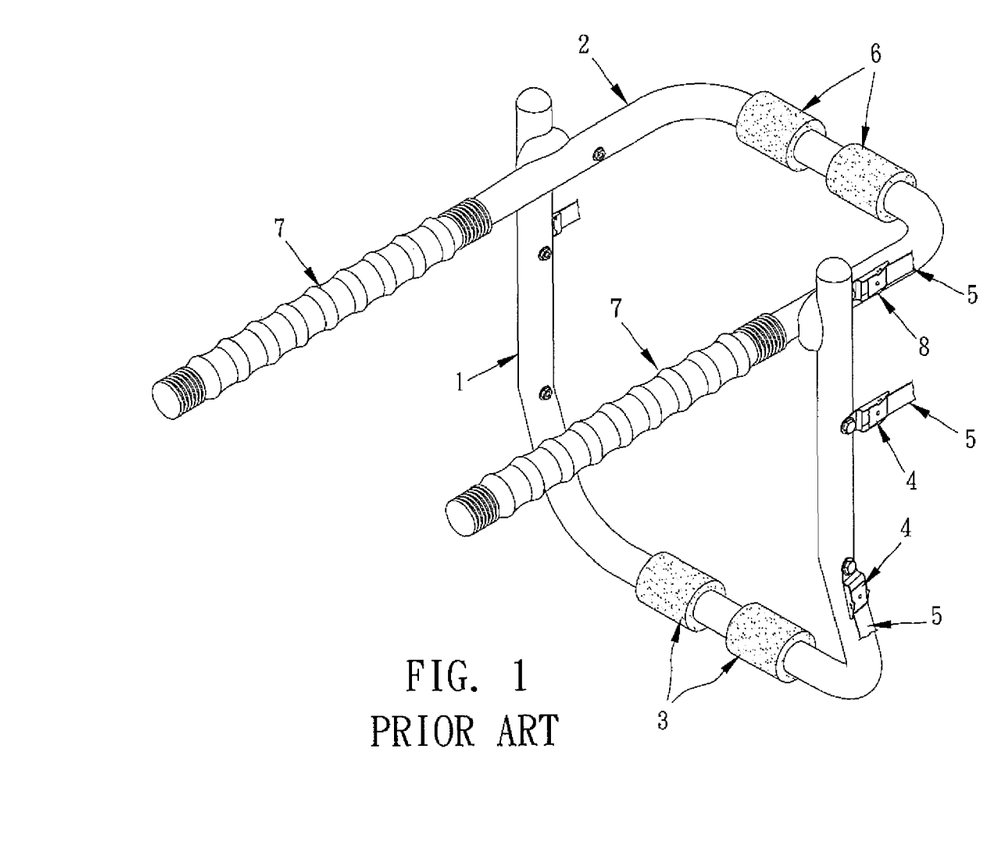
FIG. 1 is a perspective view of a conventional vehicle-carrying frame.
Figure 2:
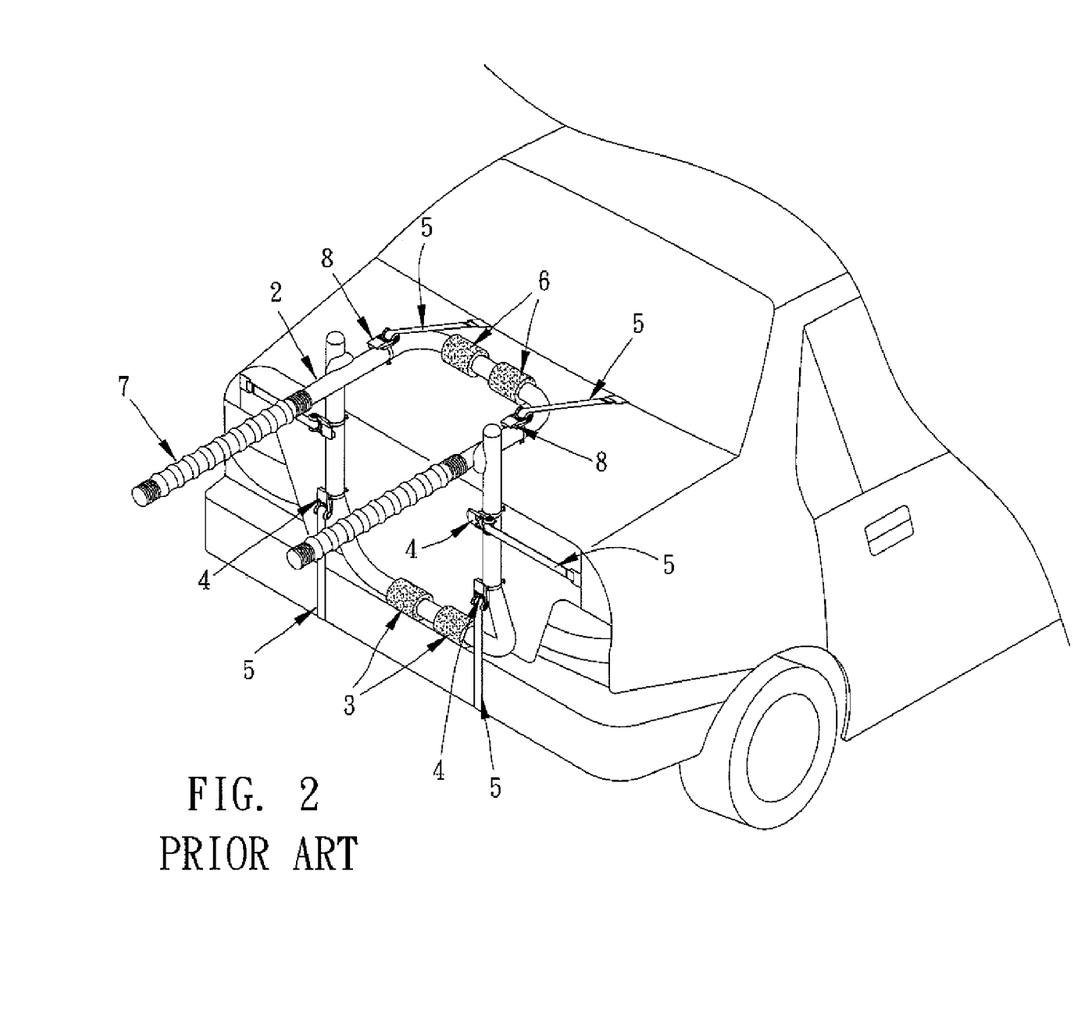
FIG. 2 is another perspective view showing the conventional vehicle-carrying frame installed on an ordinary sedan.

A conventional vehicle-carrying frame is shown in FIGS. 1 and 2, which includes a first tube frame 1 and a second tube frame 2 that are connected to each other. The first tube frame 1 is U-shaped. A bottom tube of the first tube frame 1 is mounted with two sheaths 3, and both lateral pipes of the first tube frame 1 are fixed with a positioning belt 5 for binding clasping members 4. The second tube frame 2 is U-shaped. A bottom tube of the second tube frame 2 is mounted with two sheaths 6, and both ends of the lateral pipes of the second tube frame 2 are mounted with a rubber sleeve 7 having a plurality of protruded rings. Near the bottom tube of the second tube frame 2 is fixed with two clasping members 8 for connecting to the positioning belts 5.

When using, the vehicle-carrying frame is installed on a rear side of a vehicle. The sheaths 3 of the first tube frame 1 are provided for supporting on a rear bumper, and the sheaths 6 of the second tube frame 2 are provided for supporting on a trunk cover. Since the hook portions of the ends of the positioning belts 5 are hooked at suitable positions, the bicycle can be fixed on the rubber sleeves 7 of the lateral pipes of the second tube frame 2. Thus, the bicycle is easy to carry.

However, the conventional vehicle-carrying frame has the following disadvantages:

Firstly, when using, the vehicle-carrying frame is fixed by positioning belts 5, which is unstable, and will loosen or fall off easily when driving.

Secondly, the conventional vehicle-carrying frame is only applicable to ordinary sedans and can only carry one or two bicycles, which is unpractical.

The present invention has arisen to mitigate and/or obviate the afore-described disadvantages.

SUMMARY OF THE INVENTION

The present invention provides a multi-function vehicle-carrying frame including a chassis, a positioning frame, a connecting rod, two first clasping poles, two second clasping poles, two third clasping poles and a support. The chassis is a U-shaped tube, and two flexible pads are mounted on a bottom tube of the chassis. The positioning frame is a reverse U-shaped tube and is inserted into the chassis. A movable and adjustable clipping post is disposed on a top tube of the positioning frame, and both lateral pipes of the positioning frame are locked with a movable buffer cushion. The connecting rod is fixed between the lateral pipes of the positioning frame. The first clasping poles are pivotally connected to the lateral pipes of the positioning frame. The lengths of the first clasping poles are adjustable, and one end of each first clasping pole is disposed with a hook. The second clasping poles are connected to the lateral pipes of the first clasping pole or the positioning frame. The lengths of the second clasping poles are adjustable, and one end of each second clasping pole is disposed with a hook. The third clasping poles are connected to the ends of the connecting rod. The lengths of the third clasping poles are adjustable, and one end of each third clasping pole is disposed with a hook. The support is connected to the lateral pipes of the positioning frame by a connecting member and is disposed with three groups of front and rear wheel bearing seats and a T-shaped supporting pole and can carry three bicycles simultaneously.

The primary objective of the present invention is to provide a multi-function vehicle-carrying frame for being fixed on a vehicle by clasping poles, which is stable and will not loosen or fall off when driving.

The further objective of the present invention is to provide a multi-function vehicle-carrying frame which is applicable to an ordinary sedan, wagon and van and can carry three bicycles simultaneously, which is practical.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 3:
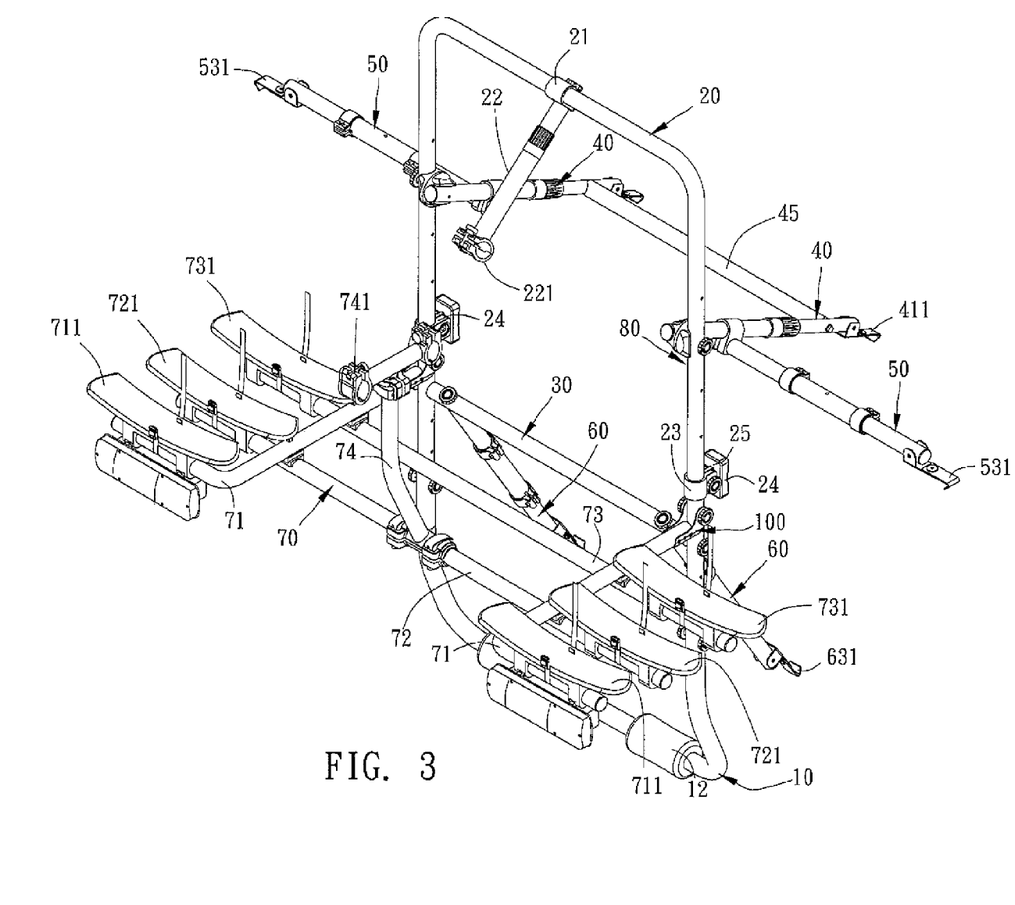
FIG. 3 is an assembly view of a multi-function vehicle-carrying frame in accordance with the present invention.
Figure 4:
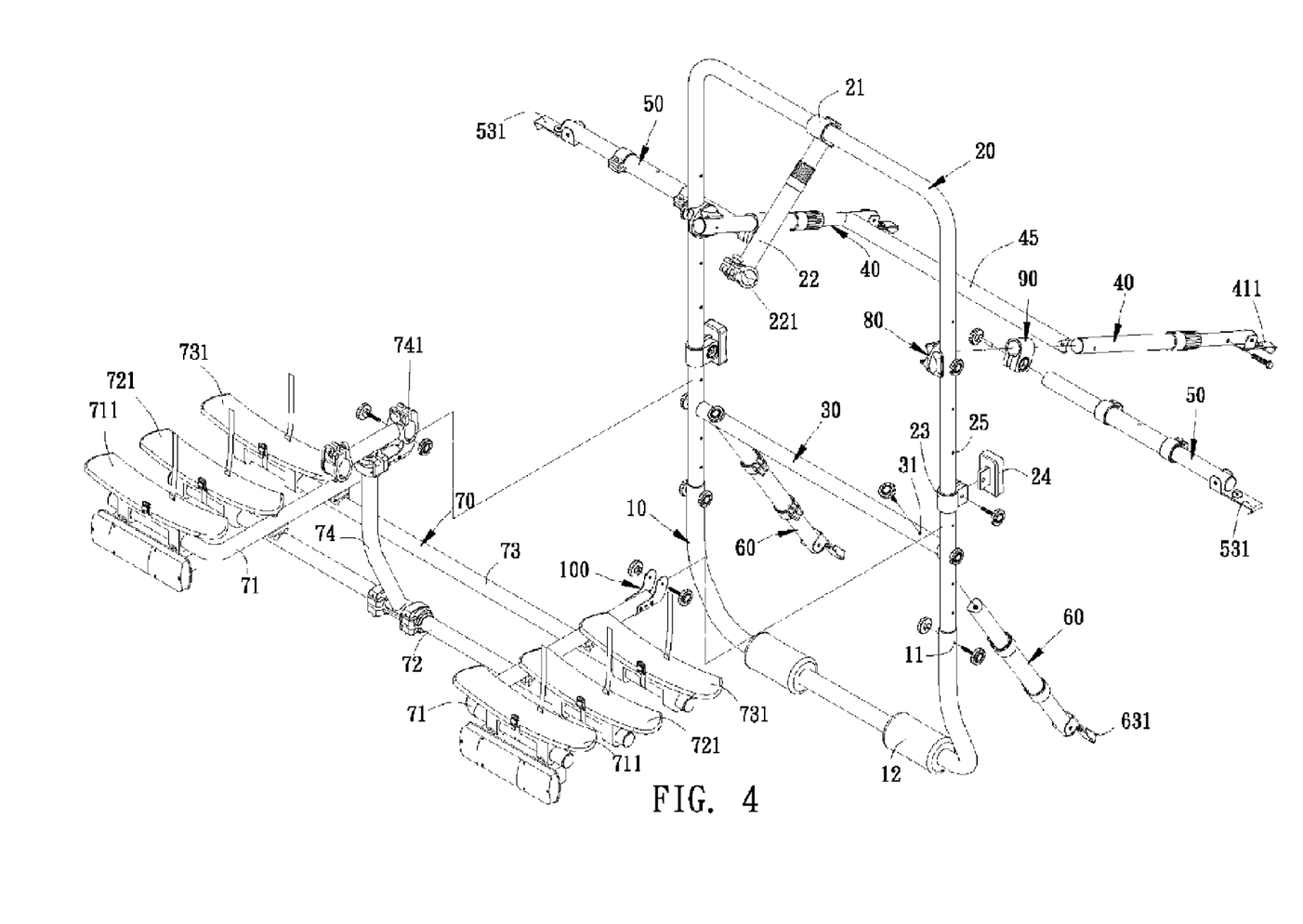
FIG. 4 is a partial exploded view of the multi-function vehicle-carrying frame in accordance with the present invention.

Referring to FIGS. 3 and 4, a multi-function vehicle-carrying frame in accordance with the present invention comprises a chassis 10, a positioning frame 20, a connecting rod 30, two first clasping poles 40, two second clasping poles 50, two third clasping poles 60 and a support 70.

The chassis 10 is a U-shaped hollow tube. Both ends of the chassis 10 are defined with a locking hole 11, and two flexible pads 12 are mounted on a bottom tube of the chassis 10.

The positioning frame 20 is a reverse U-shaped hollow tube. A movable and adjustable clipping post 22 is disposed on a top tube of the positioning frame 20 by a binding member 21 and bolts and nuts, and an end of the clipping post 22 is disposed with a clipping sleeve 221. Both lateral pipes of the positioning frame 20 are locked with a buffer cushion 24 by a binding member 23 and bolts and nuts. The lateral pipes are defined with a plurality of adjusting holes 25. Lower ends of the lateral pipes are inserted into both ends of the chassis 10 and are fixed by passing the bolts through the locking holes 11 of the chassis 10 and the adjusting holes 25 of the lateral pipes with the nuts.

The connecting rod 30 is fixed between the lateral pipes of the positioning frame 20 by passing the bolts through the adjusting holes 25, and both ends of the connecting rod 30 are formed with a positioning hole 31.

Figure 5:
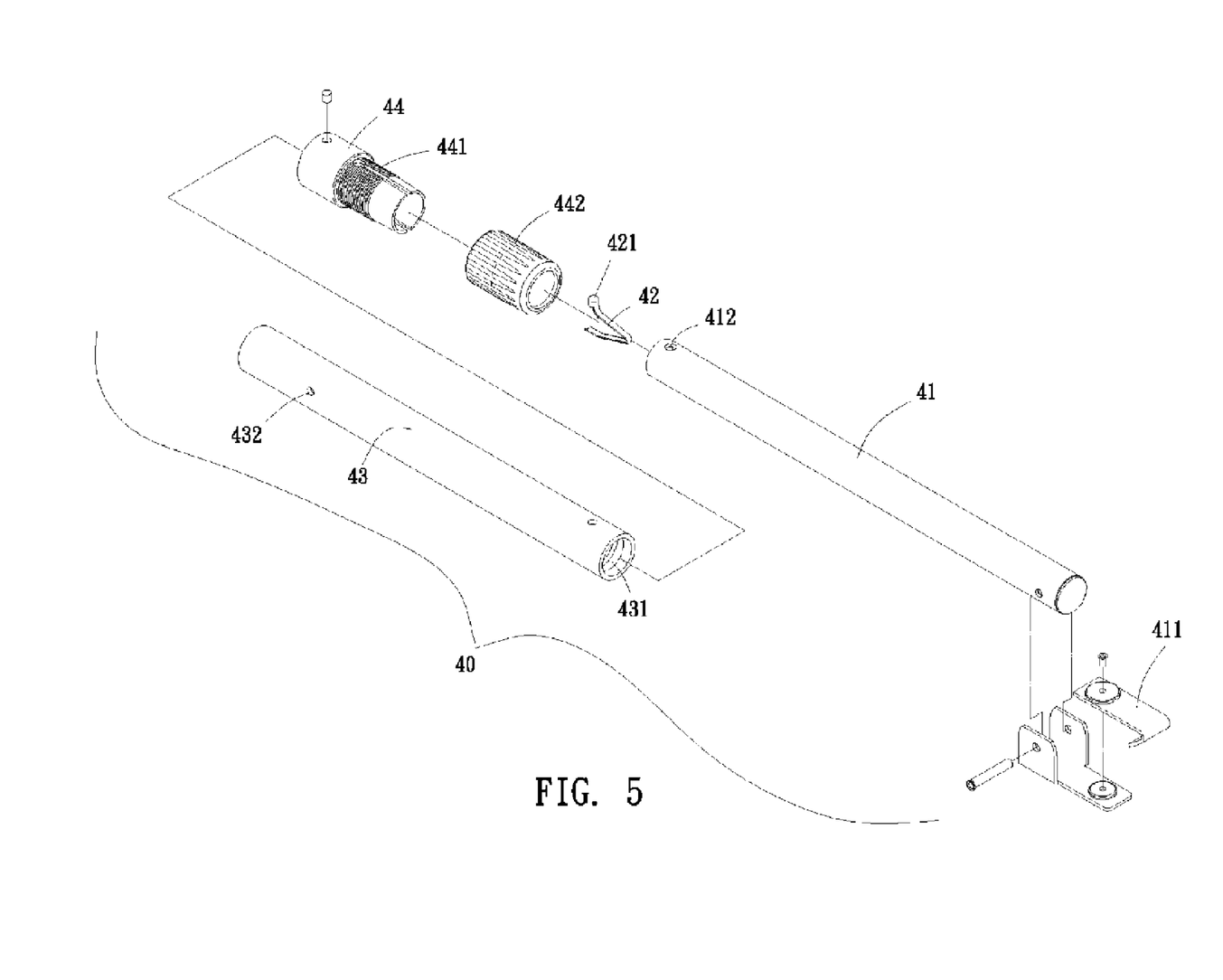
FIG. 5 is an exploded view of a first clasping pole of the multi-function vehicle-carrying frame in accordance with the present invention.
Figure 6:
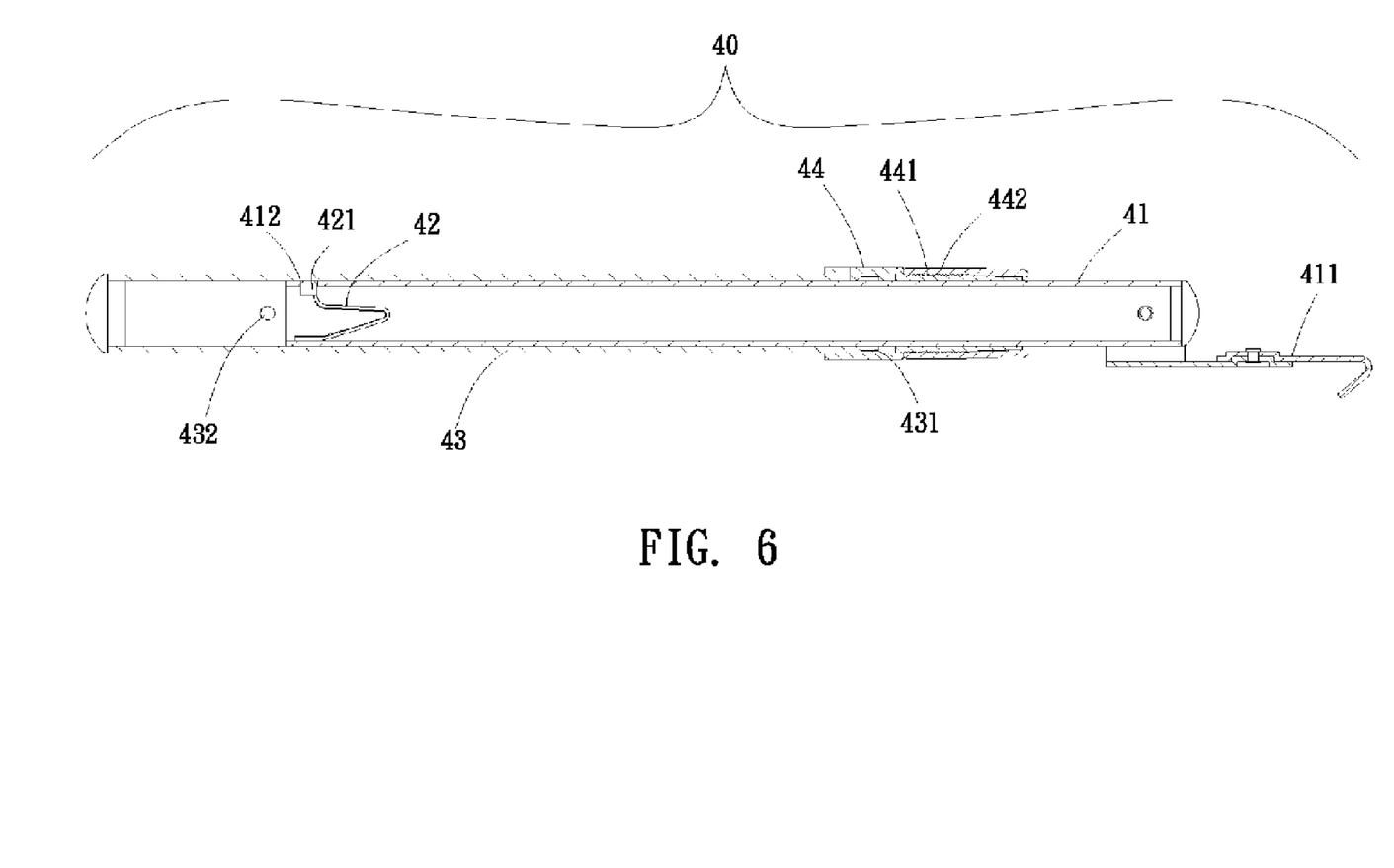
FIG. 6 is an assembly cross sectional view of the first clasping pole of the multi-function vehicle-carrying frame in accordance with the present invention.

The first clasping poles 40 are pivotally connected to the lateral pipes of the positioning frame 20 by a connecting seat 80 and the bolts as shown in FIGS. 5 and 6. One end of an inner tube 41 is mounted with a movable hook 411, and the other end of the inner tube 41 is formed with a through hole 412. A V-shaped elastic member 42 is mounted in the first clasping pole 40, and one end of the elastic member 42 is disposed with an elastic portion 421 that is protruded out of an outer side of the through hole 412. An outer periphery of the inner tube 41 is mounted with an outer tube 43. An inner periphery of one end of the outer tube 43 is formed with an engaging groove 431 for guiding an incline, and the same end of the outer tube 43 is connected to a binding tube 44. A binding portion 441 of the binding tube 44 is connected to a threaded sleeve 442, and the locking and loosening of the threaded sleeve 442 enables the binding portion 441 to be fixed by binding the inner tube 41 or to move by loosening the inner tube 41. The other end of the outer tube 43 is formed with a positioning hole 432 for connecting to the connecting seat 80, and a rail 45 is mounted between the inner tubes 41 of the first clasping poles 40. Thus, the first clasping pole 40 can be extended and contracted simultaneously.

Figure 7:
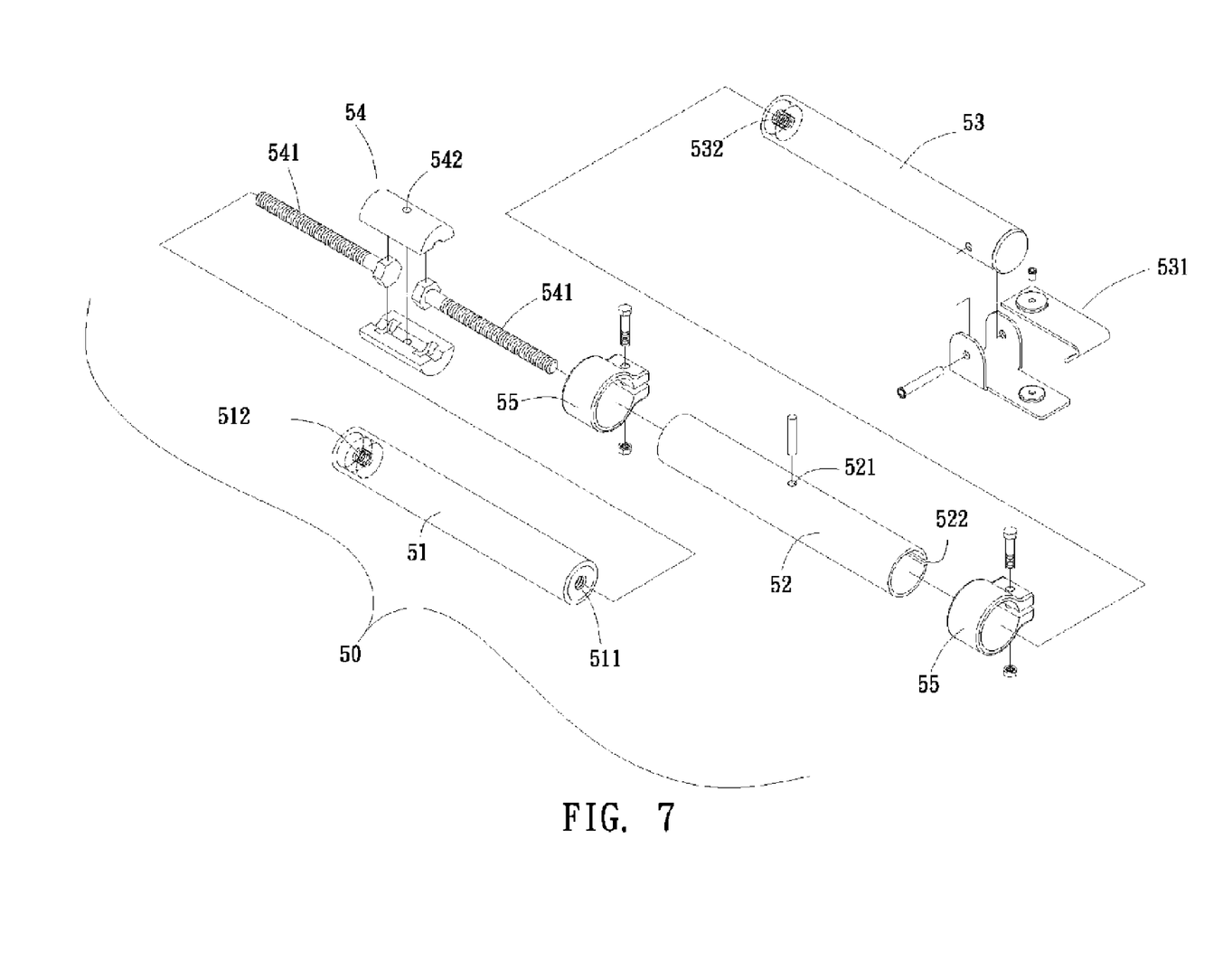
FIG. 7 is an exploded view of a second clasping pole of the multi-function vehicle-carrying frame in accordance with the present invention.
Figure 8:
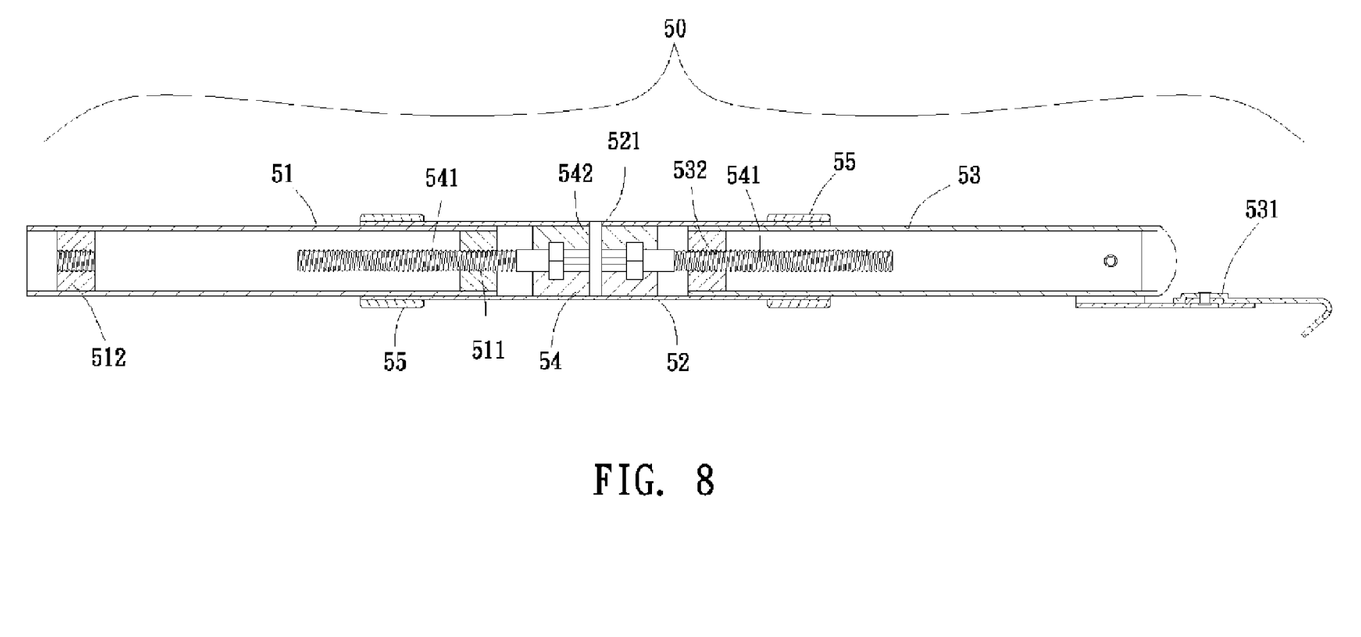
FIG. 8 is an assembly cross sectional view of the second clasping pole of the multi-function vehicle-carrying frame in accordance with the present invention.

The second clasping poles 50 are connected to the lateral pipes of the first clasping pole 40 or the positioning frame 20 by a binding member 90 and the bolts as shown in FIGS. 7 and 8. Each second clasping pole 50 includes a first pipe 51, a driving sleeve 52, a second pipe 53, a sequential member 54 and two binding sleeves 55. An opening of a front end of the first pipe 51 is defined with a threaded hole 511, and a rear end of the first pipe 51 is formed with a connecting portion 512 for connecting to the binding member 90. An intermediate portion of the driving sleeve 52 is defined with a bolt hole 521, and both ends of the driving sleeve 52 are formed with an elastic groove 522. A movable hook 531 is disposed on a front end of the second pipe 53, and a threaded hole 532 is defined in an opening of a rear end of the second pipe 53. The sequential member 54 is a column made of two semi-columns, and both ends of the column are formed with a clipping groove for fixing the relative screws 541. An intermediate portion of the column is defined with a through hole 542 for containing the sequential member 54 in the driving sleeve 52, and the sequential member 54 is fixed in the driving sleeve 52 by passing the bolt through the bolt hole 521 of the driving sleeve 52 and the through hole 542 of the sequential member 54. The screws 541 of the sequential member 54 are threaded in the threaded holes 511 of the first and second pipes 51 and 53 respectively, so that the driving sleeve 52 is mounted between the first pipe 51 and the second pipe 53. Furthermore, both ends of the driving sleeve 52 are mounted with a binding sleeve 55 for fixing the first pipe 51 and the second pipe 53, thus fixing the length of the second clasping pole 50.

Figure 9:
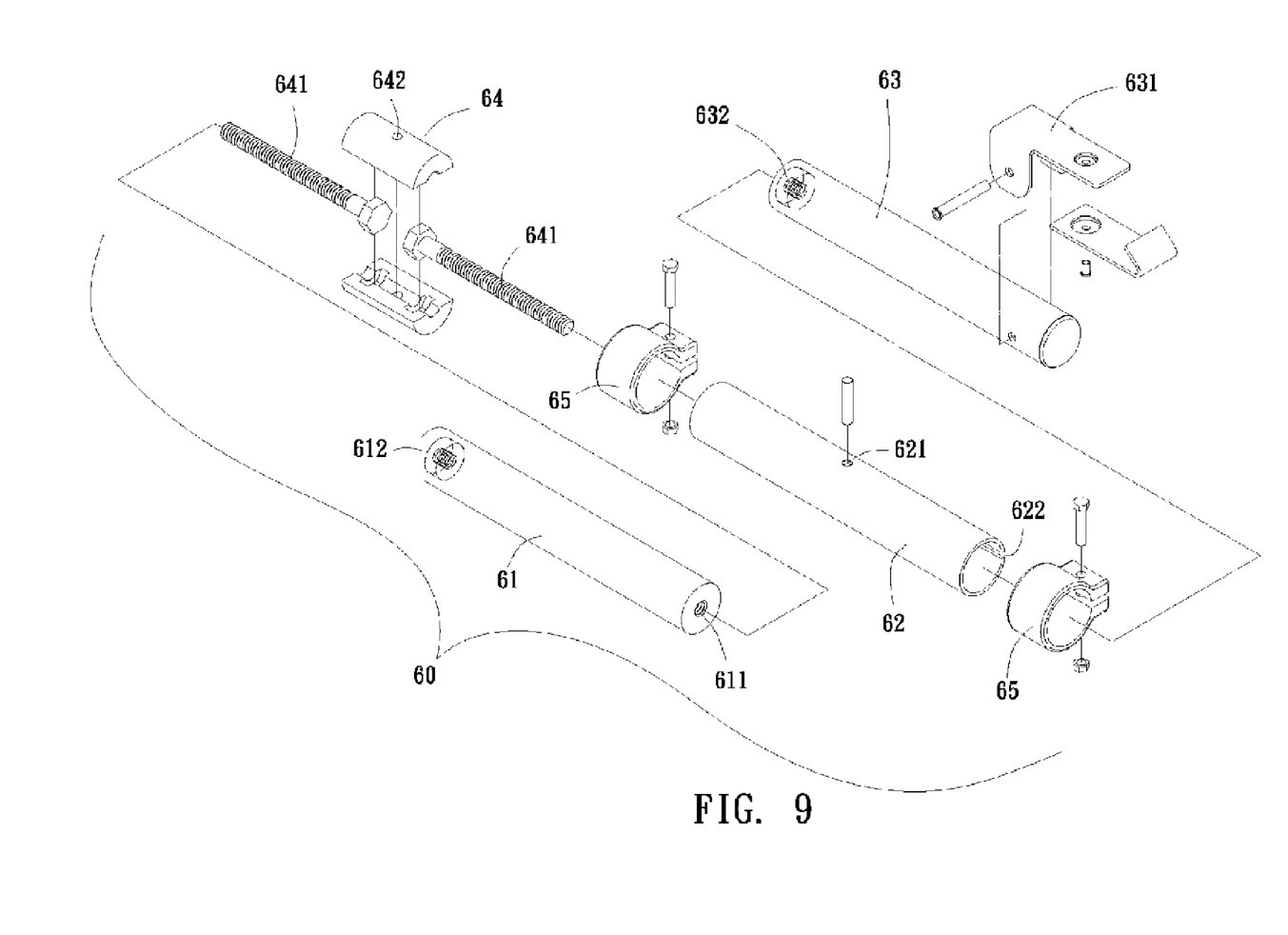
FIG. 9 is an exploded view of a third clasping pole of the multi-function vehicle-carrying frame in accordance with the present invention.
Figure 10:
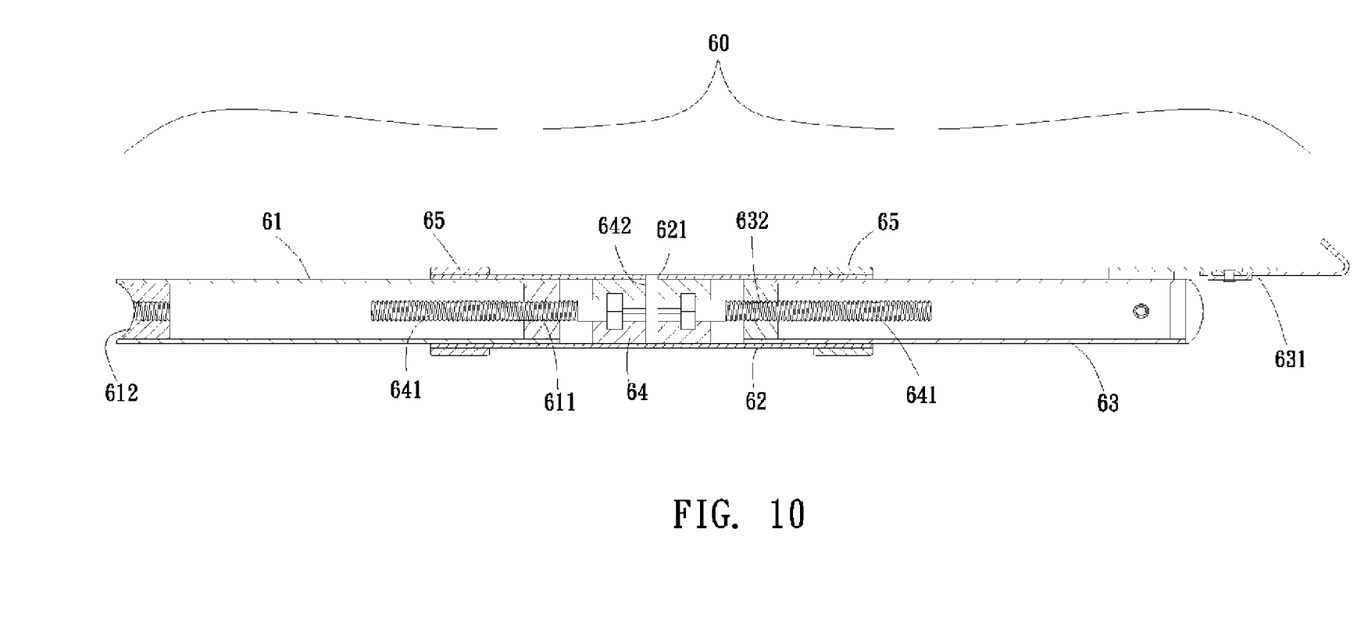
FIG. 10 is an assembly cross sectional view of the third clasping pole of the multi-function vehicle-carrying frame in accordance with the present invention.

The third clasping poles 60 are connected to the ends of the connecting rod 30 by bolts as shown in FIGS. 9 and 10. Each third clasping pole 60 includes a first pipe 61, a driving sleeve 62, a second pipe 63, a sequential member 64 and two binding sleeves 65. An opening of a front end of the first pipe 61 is defined with a threaded hole 611, and a rear end of the first pipe 61 is formed with a connecting portion 612 for connecting to the connecting rod 30. An intermediate portion of the driving sleeve 62 is defined with a bolt hole 621, and both ends of the driving sleeve 62 are formed with an elastic groove 622. A movable hook 631 is disposed on a front end of the second pipe 63, and a threaded hole 632 is defined in an opening of a rear end of the second pipe 63. The sequential member 64 is a column made of two semi-columns, and both ends of the column are formed with a clipping groove for fixing the relative screws 641. An intermediate portion of the column is defined with a through hole 642 for containing the sequential member 64 in the driving sleeve 62, and the sequential member 64 is fixed in the driving sleeve 62 by passing the bolt through the bolt hole 621 of the driving sleeve 62 and the through hole 642 of the sequential member 64. The screws 641 of the sequential member 64 are threaded in the threaded holes 611 of the first and second pipes 61 and 63 respectively, so that the driving sleeve 62 is mounted between the first pipe 61 and the second pipe 63. Furthermore, both ends of the driving sleeve 62 are mounted with a binding sleeve 65 for fixing the first pipe 61 and the second pipe 63, thus fixing the length of the third clasping pole 60.

The support 70 is connected to the lateral pipes of the positioning frame 20 by a connecting member 100, and two transverse connecting rods 72 and 73 are disposed between a left and a right supporting pole 71. The supporting poles 71 are L-shaped and are located correspondingly to each other. A front end of the respective supporting pole 71 is defined with a plurality of positioning holes for connecting to the connecting member 100, and a bent portion of a rear end of the supporting poles 71 is disposed with an angle-adjustable front and rear wheel bearing seat 711 that has warning lights. Both ends of the connecting rods 72 and 73 are disposed with an angle-adjustable front and rear wheel bearing seat 721 and 731 respectively. A T-shaped supporting pole 74 is connected to an intermediate portion of the connecting rod 72, and both ends of an upper side of the supporting pole 74 are disposed with a rotatable and adjustable clipping sleeve 741.

Figure 11:
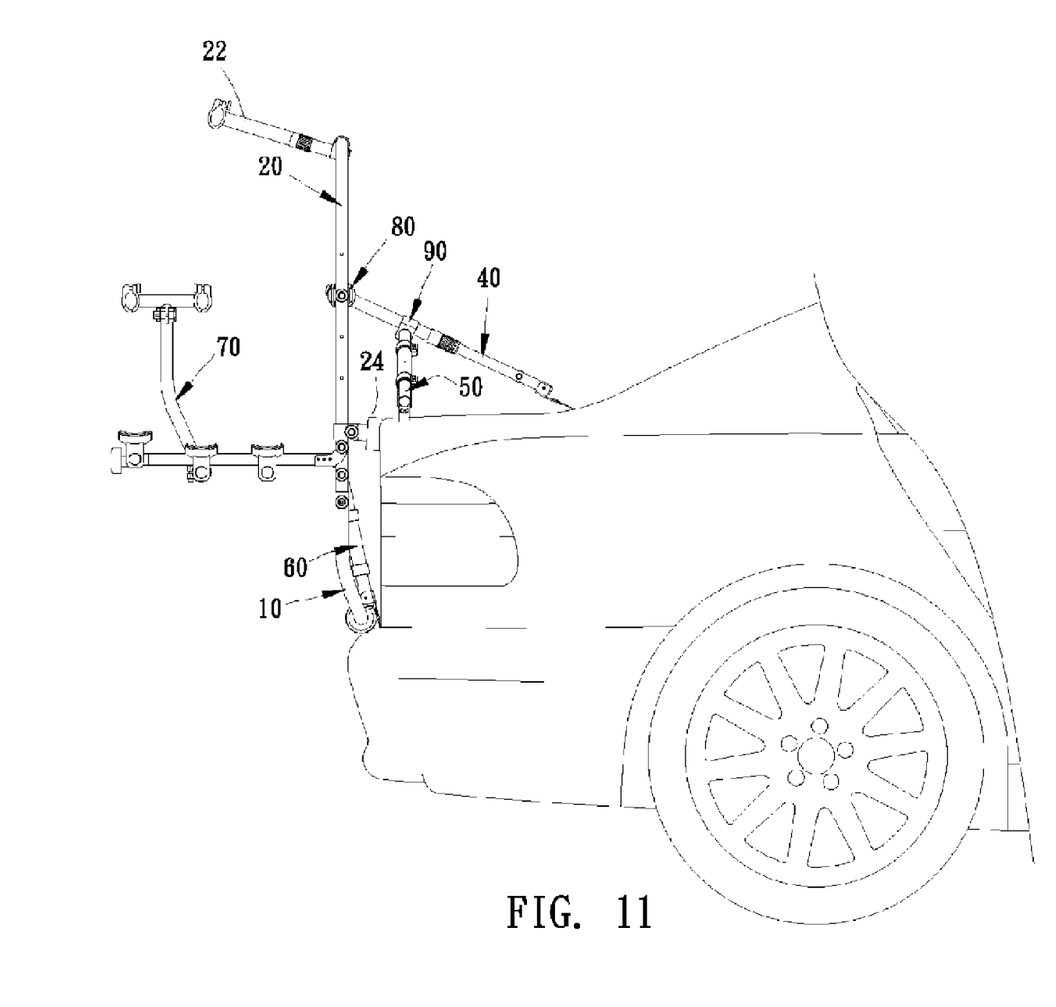
FIG. 11 is a plan view showing the multi-function vehicle-carrying frame installed on an ordinary sedan.
Figure 12:
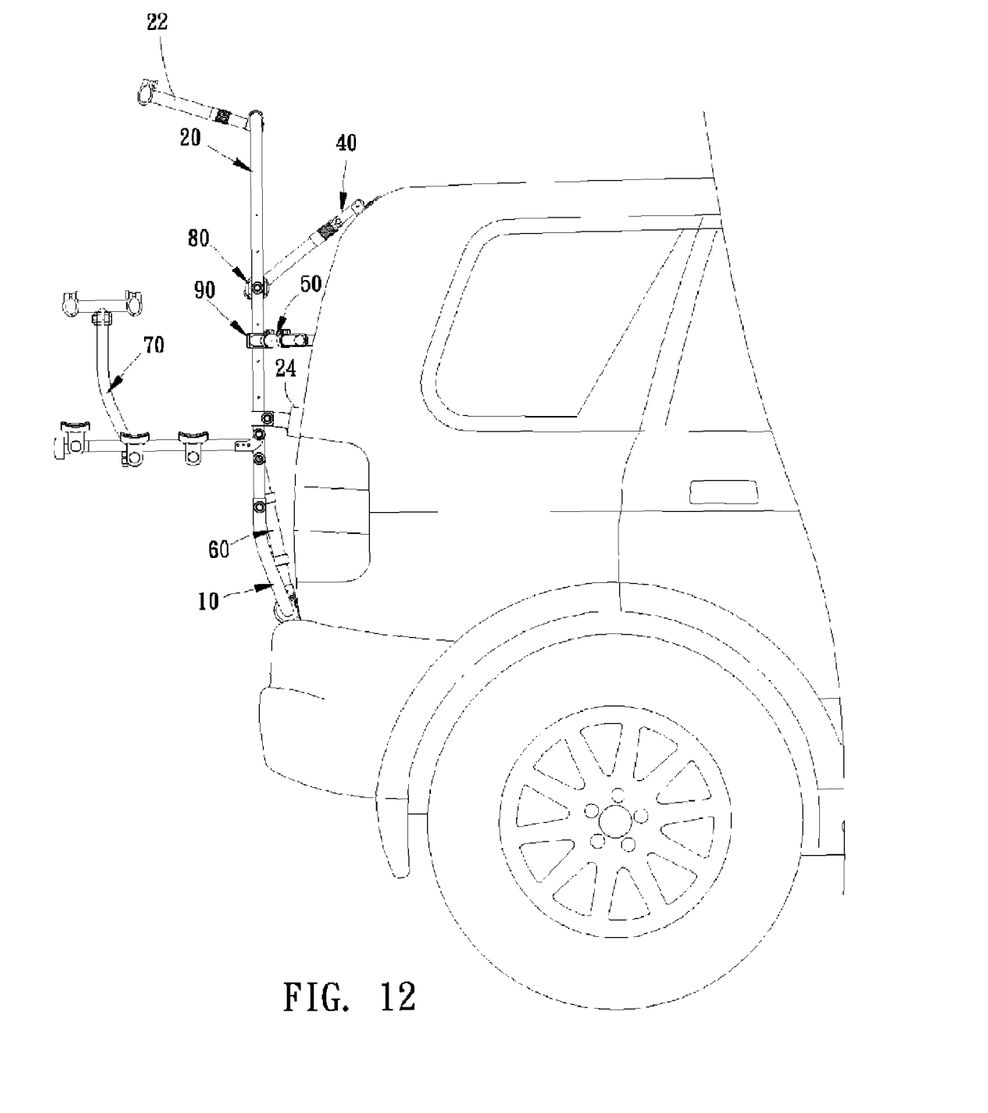
FIG. 12 is another plan view showing the multi-function vehicle-carrying frame installed on a wagon.

With reference to FIGS. 11 and 12, when installing the multi-function vehicle-carrying frame on an ordinary sedan or wagon, the user adjusts the heights of the positioning frame 20 and the buffer cushion 24 up and down and adjusts the angles and lengths of the clasping poles 40, 50, 60 according to the type of the vehicle. The user mounts the vehicle-carrying frame on a rear side of the vehicle, enabling the flexible pads 12 of the chassis 10 to to be supported on a rear bumper and the buffer cushions 24 of the lateral pipes of the positioning frame to be supported on the trunk cover or the back door of the vehicle. Then, the user loosens the threaded sleeve 442 of the first clasping pole 40 to adjust the position of the inner tube 41, enabling the binding portion 441 of the first clasping pole 40 to fix on the trunk cover or the top edge of the back door of the vehicle. Cooperating with the threaded sleeve 442, the inner tube 41 is fixed by the binding portion 441. The user loosens the binding sleeves 55 and 65 of the second and the third clasping poles 50 and 60 and rotates the driving sleeves 52 and 62 to drive the sequential members 54 and 64 simultaneously. The first and second pipes 51 and 53 of the second clasping pole 50 and the first and second pipes 61 and 63 of the third clasping pole 60 are moved relatively by the driving of the screws 541 and 641 of the sequential members 54 and 64, enabling the movable hooks 531 and 631 of the second and third clasping poles 50 and 60 to fix on the trunk cover or the lateral and the bottom edges of the back door of the vehicle. Then, the second and third clasping poles 50 and 60 are fixed by the binding sleeves 55 and 65 again.

By such arrangements, three bicycles can be installed on the support 70 together, and the front and rear wheels of the bicycle are placed on the front and rear wheel bearing seats 711, 721 and 731 respectively. The clipping post 22 is adjusted to a suitable length, and the clipping sleeve 221 of the clipping post 22 and the clipping sleeves 741 of the supporting pole 74 are provided for clipping the front and rear tube of the frame of the bicycle, such that the bicycle is fixed on the support 70 stably.

Figure 13:
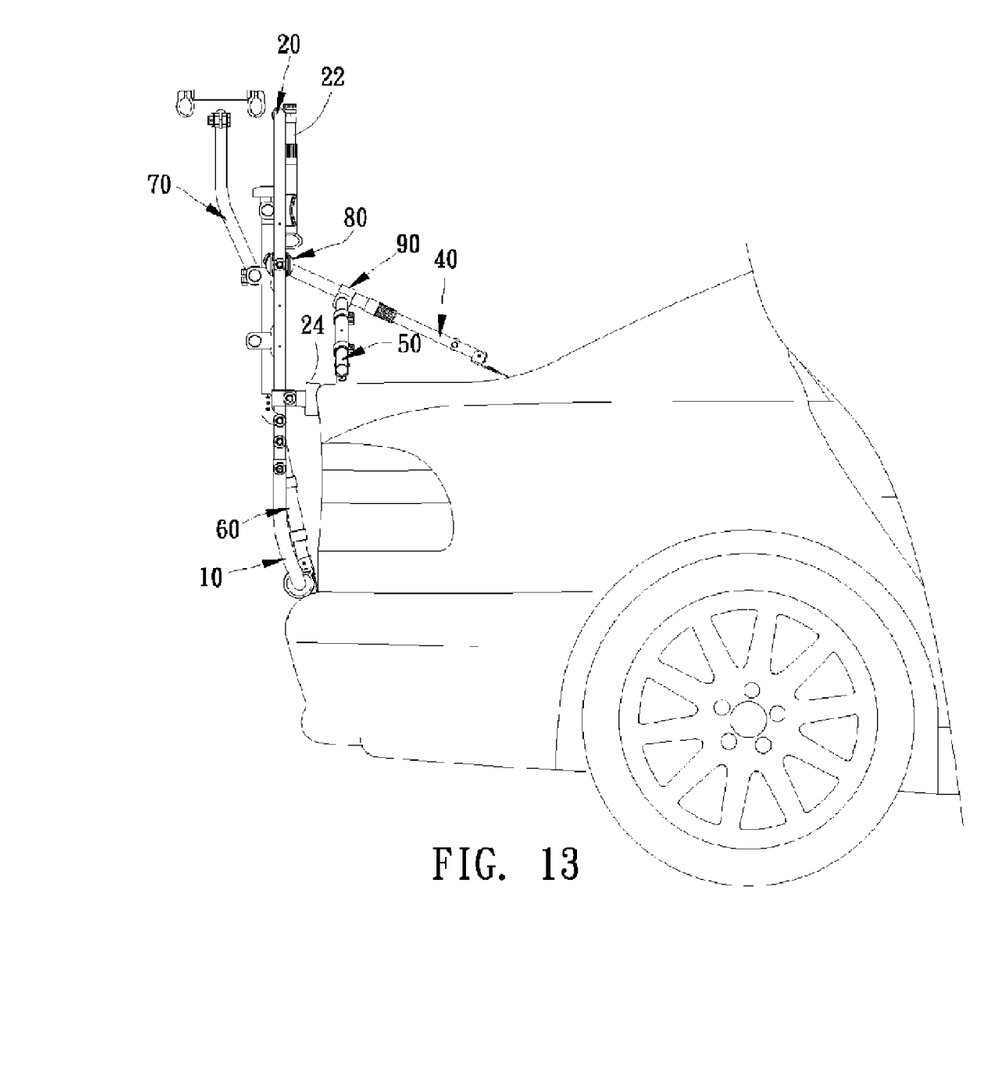
FIG. 13 is a further plan view showing the multi-function vehicle-carrying frame collected.

With reference to FIG. 13, when the vehicle-carrying frame is not in use, the clipping post 22 can be rotated appropriately, and the support 70 can be reversed upward along the connecting member 100 to reduce the size of the vehicle-carrying frame. Thus, the vehicle-carrying frame is easy to store and carry.

Firstly, when the vehicle-carrying frame is installed on the vehicle and since the clasping poles 40, 50 and 60 are adjustable, the vehicle-carrying frame can be fixed stably.

Secondly, the vehicle-carrying frame is applicable to an ordinary sedan and van and can carry three bicycles simultaneously, so the present invention is practical.

While various embodiments have been shown and described in accordance with the present invention, it should be clear to those skilled in the art that further embodiments may be made without departing from the scope of the present invention.

What is claimed is:

1. A multi-function vehicle-carrying frame comprising:
    a chassis being a U-shaped tube, with a bottom tube of the chassis being mounted with flexible pads;
    a positioning frame being a reverse U-shaped tube having two lateral pipes and inserted into the chassis, with a movable and adjustable clipping post disposed on a top tube of the positioning frame, with both lateral pipes of the positioning frame being locked with a movable buffer cushion;
    a connecting rod fixed between the lateral pipes of the positioning frame;
    two first clasping poles pivotally connected to the lateral pipes of the positioning frame, with lengths of the first clasping poles being adjustable, with one end of each first clasping pole being disposed with a hook;
    two second clasping poles connected to the first clasping poles or to the lateral pipes of the positioning frame, with lengths of the second clasping poles being adjustable, with one end of each second clasping pole being disposed with a hook;
    two third clasping poles connected to both ends of the connecting rod, with lengths of the third clasping poles being adjustable, with one end of each third clasping pole being disposed with a hook; and
    a support connected to the lateral pipes of the positioning frame by a connecting member for fixing bicycles, wherein the two first clasping poles are pivotally connected to the lateral pipes of the positioning frame by a connecting seat and bolts, wherein one end of an inner tube of each first clasping pole is mounted with a movable hook, wherein another end of the inner tube is formed with a through hole, wherein a V-shaped elastic member is mounted in the first clasping pole, wherein one end of the elastic member is disposed with an elastic portion protruded out of an outer side of the through hole, wherein an outer periphery of the inner tube is mounted with an outer tube, wherein an inner periphery of one end of the outer tube is formed with an engaging groove for guiding an incline, wherein the one end of the outer tube is connected to a binding tube, wherein a binding portion of the binding tube is connected to a threaded sleeve, and wherein another end of the outer tube is defined with a positioning hole for connecting to the connecting seat.

2. The multi-function vehicle-carrying frame as claimed in claim 1, wherein a rail is mounted between the two first clasping poles.

3. The multi-function vehicle-carrying frame as claimed in claim 1, wherein an end of the clipping post of the positioning frame is disposed with a clipping sleeve.

4. The multi-function vehicle-carrying frame as claimed in claim 1, wherein the lateral pipes of the positioning frame are defined with a plurality of adjusting holes.

5. The multi-function vehicle-carrying frame as claimed in claim 1, wherein both ends of the connecting rod are fanned with a positioning hole.

6. A multi-function vehicle-carrying frame comprising:
    a chassis being a U-shaped tube, with a bottom tube of the chassis being mounted with flexible pads;
    a positioning frame being a reverse U-shaped tube having two lateral pipes and inserted into the chassis, with a movable and adjustable clipping post disposed on a top tube of the positioning frame, with both lateral pipes of the positioning frame being locked with a movable buffer cushion;
    a connecting rod fixed between the lateral pipes of the positioning frame;
    two first clasping poles pivotally connected to the lateral pipes of the positioning frame, with lengths of the first clasping poles being adjustable, with one end of each first clasping pole being disposed with a hook;
    two second clasping poles connected to the first clasping poles or to the lateral pipes of the positioning frame, with lengths of the second clasping poles being adjustable, with one end of each second clasping pole being disposed with a hook;
    two third clasping poles connected to both ends of the connecting rod, with lengths of the third clasping poles being adjustable, with one end of each third clasping pole being disposed with a hook; and
    a support connected to the lateral pipes of the positioning frame by a connecting member for fixing bicycles, wherein the two second clasping poles are connected to the two first clasping poles or to the lateral pipes of the positioning frame by a binding member and bolts, wherein each second clasping pole comprises a first pipe, a driving sleeve, a second pipe, a sequential member and two binding sleeves, wherein a front end of the first pipe is defined with a threaded hole, wherein a rear end of the first pipe is formed with a connecting portion for connecting to the binding member, wherein an intermediate portion of the driving sleeve is defined with a bolt hole, wherein both ends of the driving sleeve are formed with an elastic groove, wherein a movable hook is disposed on a front end of the second pipe, wherein a threaded hole is defined in a rear end of the second pipe, wherein the sequential member is a column made of two semi-columns, wherein both ends of the column are formed with a clipping groove for fixing screws, wherein an intermediate portion of the column is defined with, a through hole for containing the sequential member in the driving sleeve, wherein the screws of the sequential member are threaded in the threaded holes of the first and second pipes respectively, and wherein both ends of the driving sleeve are mounted with the binding sleeves for fixing the first and the second pipes, thus adjusting and fixing the length of the second clasping pole.

7. The multi-function vehicle-carrying frame as claimed in claim 6, wherein an end of the clipping post of the positioning frame is disposed with a clipping sleeve.

8. The multi-function vehicle-carrying frame as claimed in claim 6, wherein the lateral pipes of the positioning frame are defined with a plurality of adjusting holes.

9. The multi-function vehicle-carrying frame as claimed in claim 6, wherein both ends of the connecting rod are formed with a positioning hole.

10. The multi-function vehicle-carrying frame as claimed in claim 6, wherein a rail is mounted between the two first clasping poles.

11. The multi-function vehicle-carrying frame as claimed in claim 6, wherein the two first clasping poles are pivotally connected to the lateral pipes of the positioning frame by a connecting seat and bolts, wherein one end of an inner tube of each first clasping pole is mounted with a movable hook, wherein another end of the inner tube is formed with a through hole, wherein a V-shaped elastic member is mounted in the first clasping pole, wherein one end of the elastic member is disposed with an elastic portion protruded out of an outer side of the through hole, wherein an outer periphery of the inner tube is mounted with an outer tube, wherein an inner periphery of one end of the outer tube is formed with an engaging groove for guiding an incline, wherein the one end of the outer tube is connected to a binding tube, wherein a binding portion of the binding tube is connected to a threaded sleeve, and wherein another end of the outer tube is defined with a positioning hole for connecting to the connecting seat.

12. The multi-function vehicle-carrying frame as claimed in claim 11, wherein the two third clasping poles are connected to ends of the connecting rod by bolts, wherein each third clasping pole comprises a first pipe, a driving sleeve, a second pipe, a sequential member and two binding sleeves, wherein a front end of the first pipe is defined with a threaded hole, wherein a rear end of the first pipe is formed with a connecting portion for connecting to the connecting rod, wherein an intermediate portion of the driving sleeve is defined with a bolt hole, wherein both ends of the driving sleeve are formed with an elastic groove, wherein a movable hook is disposed on a front end of the second pipe, wherein a threaded hole is defined in a rear end of the second pipe, wherein the sequential member is a column made of two semi-columns, wherein both ends of the column are formed with a clipping groove for fixing screws, wherein an intermediate portion of the column is defined with a through hole for containing the sequential member in the driving sleeve, wherein the screws of the sequential member are threaded in the threaded holes of the first and the second pipes respectively, and wherein both ends of the driving sleeve are mounted with the binding sleeves for fixing the first and the second pipes, thus adjusting and fixing a length of the third clasping pole.

13. A multi-function vehicle-carrying frame comprising:
a chassis being a U-shaped tube, with a bottom tube of the chassis being mounted with flexible pads;
a positioning frame being a reverse U-shaped tube having two lateral pipes and inserted into the chassis, with a movable and adjustable clipping post disposed on a top tube of the positioning frame, with both lateral pipes of the positioning frame being locked with a movable buffer cushion;
a connecting rod fixed between the lateral pipes of the positioning frame;
two first clasping poles pivotally connected to the lateral pipes of the positioning frame, with lengths of the first clasping poles being adjustable, with one end of each first clasping pole being disposed with a hook;
two second clasping poles connected to the first clasping poles or to the lateral pipes of the positioning frame, with lengths of the second clasping poles being adjustable, with one end of each second clasping pole being disposed with a hook;
two third clasping poles connected to both ends of the connecting rod, with lengths of the third clasping poles being adjustable, with one end of each third clasping pole being disposed with a hook; and
a support connected to the lateral pipes of the positioning frame by a connecting member for fixing bicycles, wherein the two third clasping poles are connected to ends of the connecting rod by bolts, wherein each third clasping pole comprises a first pipe, a driving sleeve, a second pipe, a sequential member and two binding sleeves, wherein a front end of the first pipe is defined with a threaded hole, wherein a rear end of the first pipe is formed with a connecting portion for connecting to the connecting rod, wherein an intermediate portion of the driving sleeve is defined with a bolt hole, wherein both ends of the driving sleeve are formed with an elastic groove, wherein a movable hook is disposed on a front end of the second pipe, wherein a threaded hole is defined in a rear end of the second pipe, wherein the sequential member is a column made of two semi-columns, wherein both ends of the column are formed with a clipping groove for fixing screws, wherein an intermediate portion of the column is defined with a through hole for containing the sequential member in the driving sleeve, wherein the screws of the sequential member are threaded in the threaded holes of the first and the second pipes respectively, and wherein both ends of the driving sleeve are mounted with the binding sleeves for fixing the first and the second pipes, thus adjusting and fixing the length of the third clasping pole.

14. The multi-function vehicle-carrying frame as claimed in claim 13, wherein an end of the clipping post of the positioning frame is disposed with a clipping sleeve.

15. The multi-function vehicle-carrying frame as claimed in claim 13, wherein the lateral pipes of the positioning frame are defined with a plurality of adjusting holes.

16. The multi-function vehicle-carrying frame as claimed in claim 13, wherein both ends of the connecting rod are formed with a positioning hole.

17. The multi-function vehicle-carrying frame as claimed in claim 13, wherein a rail is mounted between the two first clasping poles.

18. The multi-function vehicle-carrying frame as claimed in claim 13, wherein the two first clasping poles are pivotally connected to the lateral pipes of the positioning frame by a connecting seat and bolts, wherein one end of an inner tube of each first clasping pole is mounted with a movable hook, wherein another end of the inner tube is formed with a through hole, wherein a V-shaped elastic member is mounted in the first clasping pole, wherein one end of the elastic member is disposed with an elastic portion protruded out of an outer side of the through hole, wherein an outer periphery of the inner tube is mounted with an outer tube, wherein an inner periphery of one end of the outer tube is formed with an engaging groove for guiding an incline, wherein the one end of the outer tube is connected to a binding tube, wherein a binding portion of the binding tube is connected to a threaded sleeve, and wherein another end of the outer tube is defined with a positioning hole for connecting to the connecting seat.

19. The multi-function vehicle-carrying frame as claimed in claim 13, wherein the two second clasping poles are connected to the two first clasping poles or to the lateral pipes of the positioning frame by a binding member and bolts, wherein each second clasping pole comprises a first pipe, a driving sleeve, a second pipe, a sequential member and two binding sleeves, wherein a front end of the first pipe is defined with a threaded hole, wherein a rear end of the first pipe is formed with a connecting portion for connecting to the binding member, wherein an intermediate portion of the driving sleeve is defined with a bolt hole, wherein both ends of the driving sleeve are formed with an elastic groove, wherein a movable hook is disposed on a front end of the second pipe, wherein a threaded hole is defined in a rear end of the second pipe, wherein the sequential member is a column made of two semi-columns, wherein both ends of the column are formed with a clipping groove for fixing screws, wherein an intermediate portion of the column is defined with a through hole for containing the sequential member in the driving sleeve, wherein the screws of the sequential member are threaded in the threaded holes of the first and second pipes respectively, and wherein both ends of the driving sleeve are mounted with the binding sleeves for fixing the first and the second pipes, thus adjusting and fixing a length of the second clasping pole.

\* \* \* \* \*